Oct. 4, 1966  S. A. KERVEFORS  3,276,492
METHOD AND APPARATUS FOR TRIMMING TIMBER BY MEANS OF MUTUALLY
ADJUSTABLE PARALLEL CUTTING MEMBERS
Filed Dec. 18, 1963
3 Sheets-Sheet 1
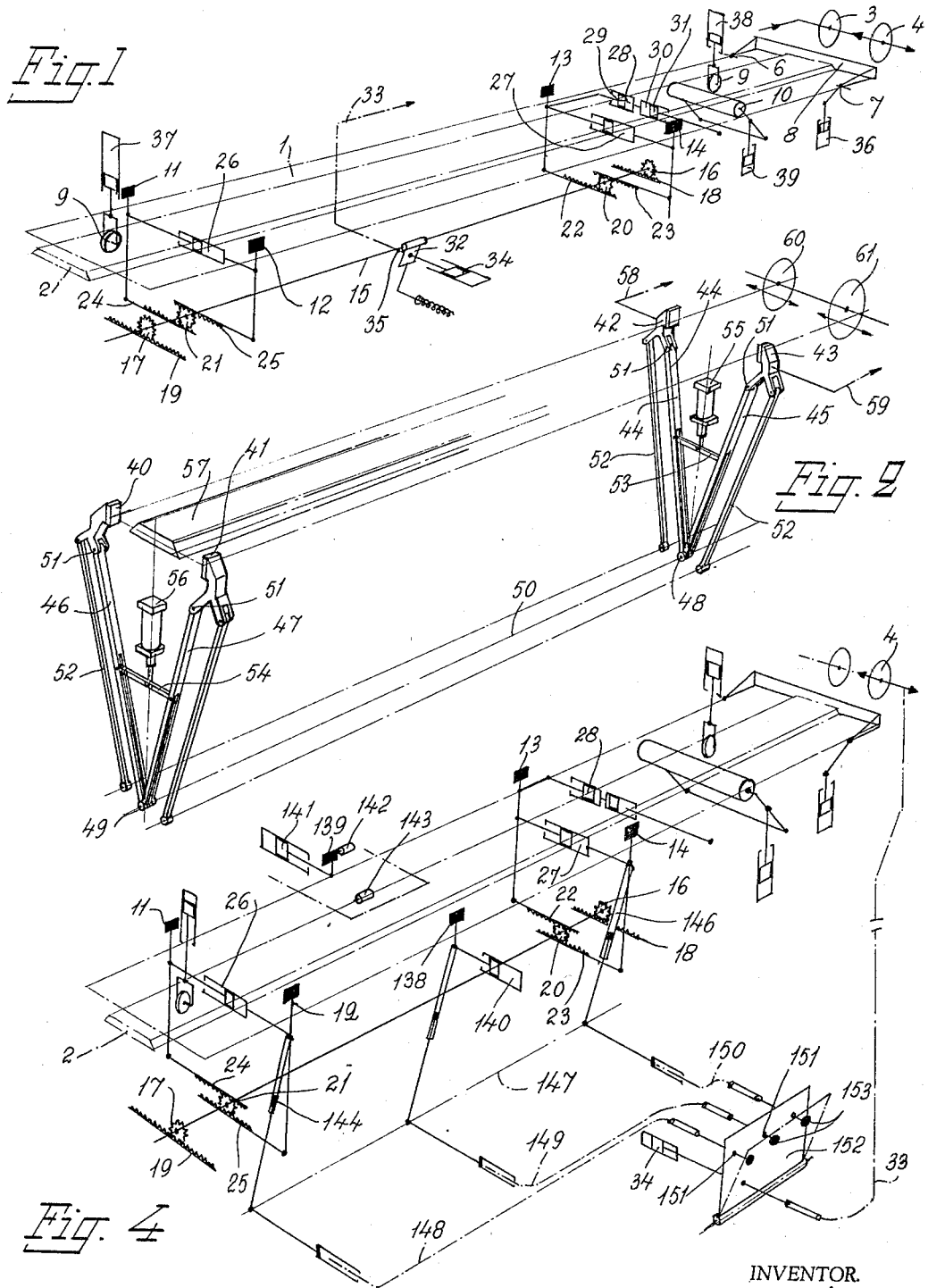
INVENTOR.
Stig A. Kervefors
BY
Stevens, Davis, Miller & Mosher
Attorneys INVENTOR.
Stig A. Kervefors
BY
Stevens, Davis, Miller + Mosher
ATTORNEYS

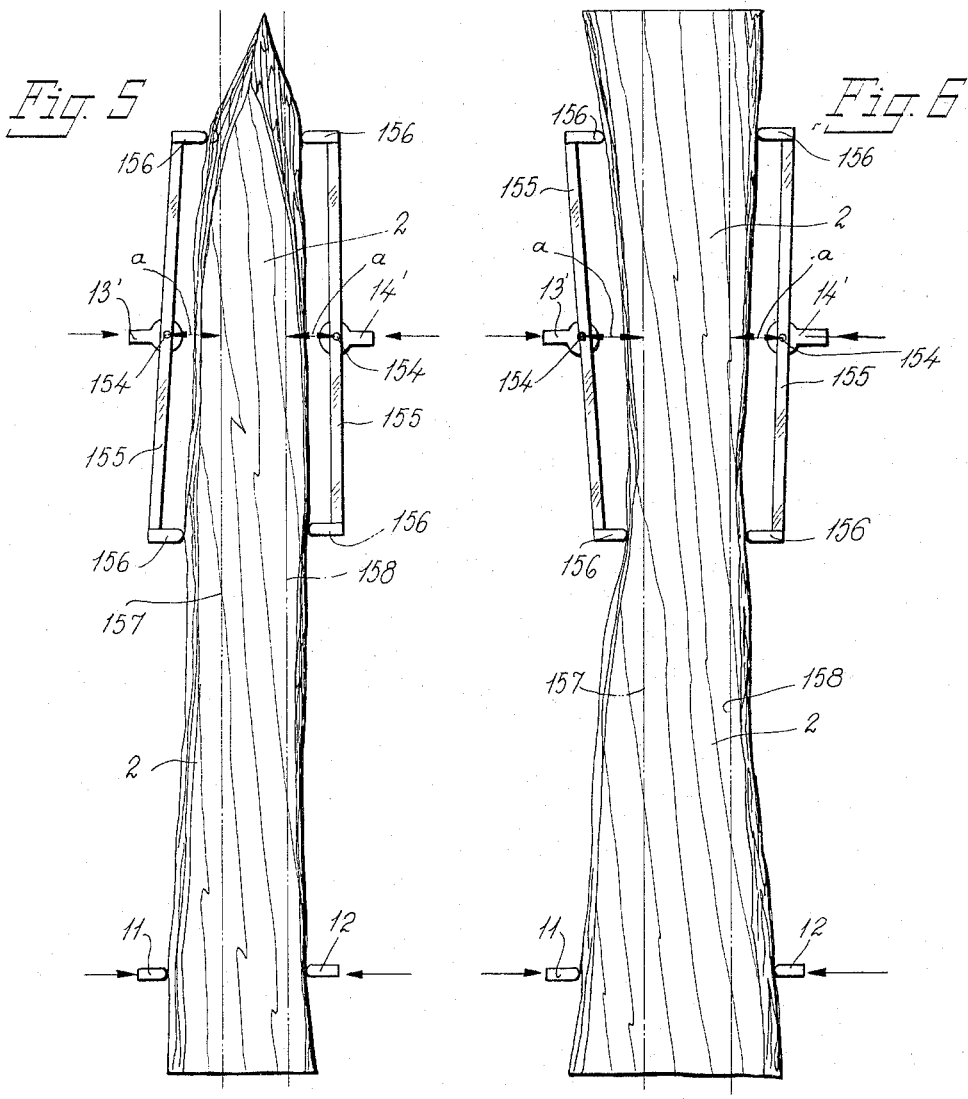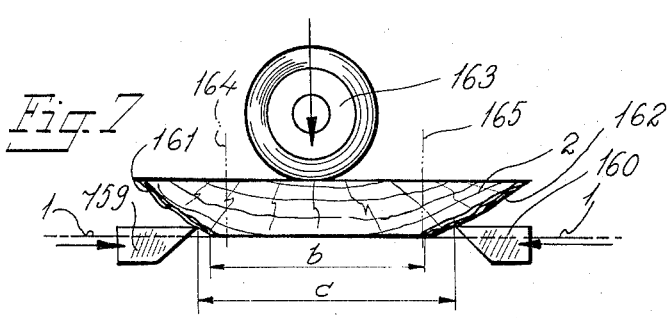

United States Patent Office 3,276,492
Patented Oct. 4, 1966

3,276,492
METHOD AND APPARATUS FOR TRIMMING TIMBER BY MEANS OF MUTUALLY ADJUSTABLE PARALLEL CUTTING MEMBERS
Stig Axel Kervefors, Rotebro, Sweden, assignor to Stora Kopparbergs Bergslags Aktiebolag, Falun, Sweden, a joint-stock company limited of Sweden
Filed Dec. 18, 1963, Ser. No. 331,410
Claims priority, application Sweden, Dec. 21, 1962, 13,914/62
12 Claims. (Cl. 143—37)

The present invention relates to a method for trimming timber by means of mutually adjustable parallel cutting members, for the purpose of effecting an end product with a rectangular cross-section.

In trimming timber, especially in edging boards, the cutting members are usually adjusted in relation to the timber by optical means which, depending on the mutual positions of the cutting members, cast for example shadow lines on the piece of timber in question, the cutting members being adjusted and the piece of timber being aligned manually according to the shadow lines while endeavouring to yield the highest possible amount of clean wood in trimming.

This method, which usually requires two men, assumes however a not inconsiderable degree of skill on the part of those operating the trimming mechanism and has inter alia the inconvenience that a plank which is to be edged, must always be turned with its vanes upwards.

In the saw mill industry, there is as a rule a need to be able to increase the capacity and mechanization, partly to increase economic profit, partly to be less dependent on skilled personnel.

It is thus an aim of the invention to increase the capacity of arrangements for trimming timber by reducing the number of operators required and the number of manual measures which must be undertaken, but at the same time eliminating the risk of misjudgment on the part of the operator.

The invention is based on the observation that it is possible, by measuring the width of a log or untrimmed plank, at least at a predetermined distance from one end of the plank or log, to be able to predict with fairly good precision the most economical dimensions of the processed, trimmed piece of timber.

In accordance with this, the invention is characterized principally in that the piece of timber and the cutting members are automatically aligned relatively to each other so that the longitudinal axis of the timber is parallel to the cutting members, that the width of the piece of timber is sensed at at least a predetermined place along its length and that the cutting members are adjusted depending on the sensed width in order to yield an economically practical amount of wood with trimmed side surfaces.

The invention also relates to an apparatus for carrying out the method, consisting of a table for carrying a piece of timber which is to be aligned in relation to the cutting members in a cutting means and which, having been so aligned, is processed by them. The apparatus is characterized principally in that the aligning table presents movable alignment members which are arranged to automatically align the timber with its longitudinal axis parellel to the cutting members.

In an especially preferred embodiment of the apparatus according to the invention, the alignment table presents at least one sensing means for automatically sensing the width of the piece of timber at a predetermined distance from one end of the timber and an adjustment means for adjusting the cutting members depending on the sensed width.

The invention will be further explained below with reference to a number of diagrammatically illustrated embodiments and in connection with this, further characterizing features of the invention will be set forth.

FIG. 1 diagrammatically illustrates in perspective the mutual coordination between the most important details in a so-called alignment table for carrying out the process according to the invention, which table is intended to be located in front of an edge-trimming apparatus with two parallel rotating saw blades, of which one is axially stationary and the other is movable and adjustable in the same direction from the alignment table.

FIG. 2 also diagrammatically illustrates in perspective the most vital parts of another embodiment of an alignment table according to the invention, which table is assumed to be coordinated with an edge trimming apratus with two saw blades rotating parallel to each other, both of which are axially movable and adjustable in the same direction from the alignment table.

FIG. 4 shows diagrammatically in perspective a modification of the arrangement according to FIG. 1.

FIGS. 5 and 6 show modified jaw members for sensing the width of particularly irregular boards.

FIG. 7 shows a further modification of the jaws adapted to boards having wane widths that vary greatly.

Figure 3:
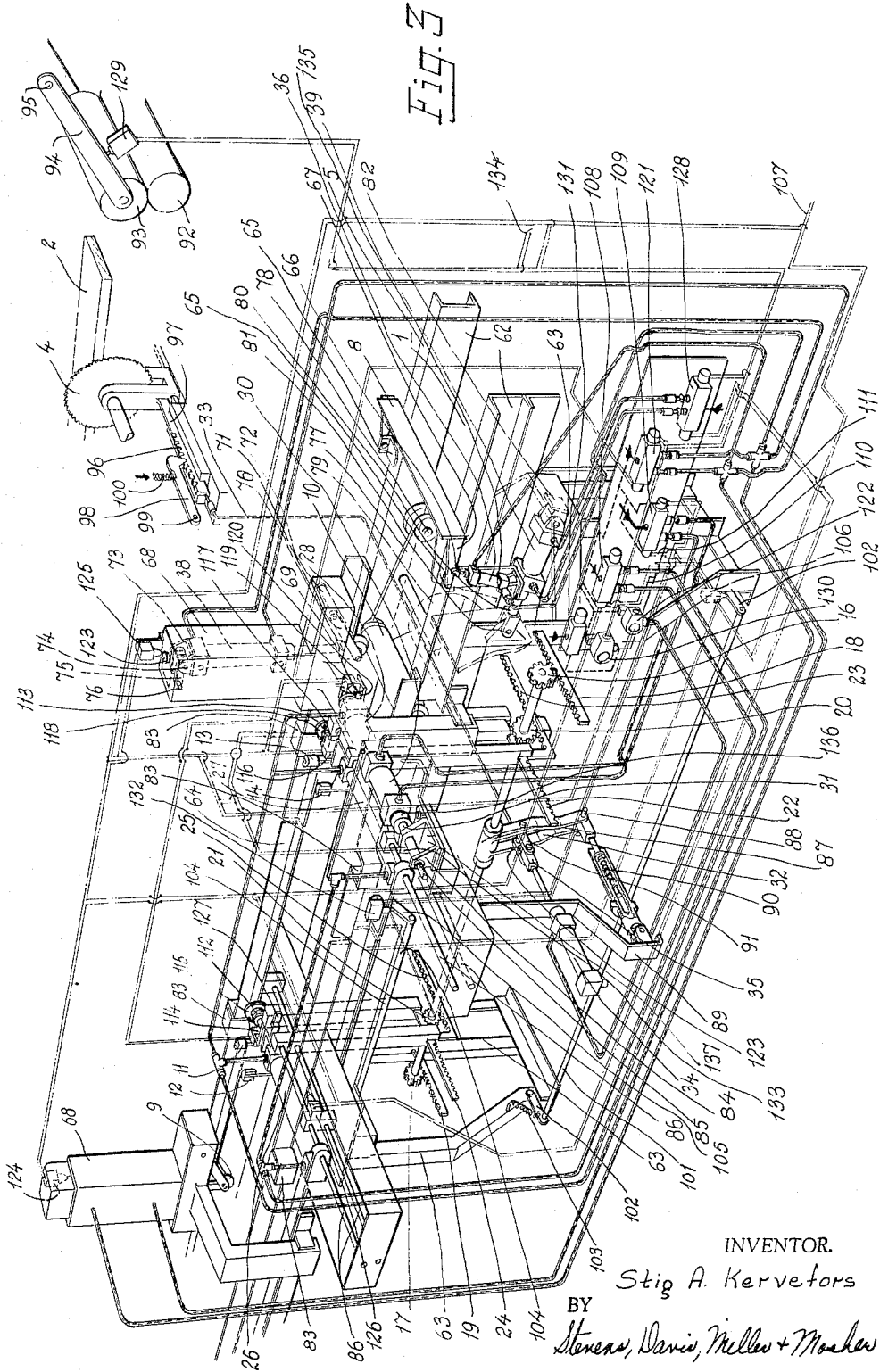
FIG. 3 shows in perspective a detailed embodiment of substantially the same alignment table as shown in FIG. 1.

With reference to FIG. 1, a table plane is indicated with broken lines 1, on which plane pieces of timber, for example in the form of the plank 2, which are to have their edges trimmed are placed, in order to be aligned before advancement between the saw blades 3 and 4 in a sawing arrangement or edge trimming apparatus located in front of them.

It is assumed at this edge trimming apparatus that the saw blade 3 is stationary in an axial direction, while the saw blade 4 is movable and adjustable in the same direction, the intention of the inventive aim being principally to align the planks with respect to the saw blades and to adjust the mutual distance of the saw blades in connection with sensing the width of the plank 2 at a predetermined distance from one end of the plank, e.g. the farther end 5 in the drawing. To obtain a definite stop position for the plank in order to be able to sense the said width at the determined distance therefrom, a stop shield 8 is pivotally mounted around points 6 and 7 at the farther end of the table 1, which stop shield 8 in the position shown in the figure rests against the table 1 in its stop position with the end 5 of the plank abutting it, but which can be swung out of the path of the plank so that the latter, after being aligned on the alignment table, can be advanced in positively guided position between the saw blades 3 and 4 in the edge-trimming apparatus.

The positive guiding and feeding of the plank is effected by means of vertically movable pressure rollers 9 which are depressed against the plank by means of a motor driven feed cylinder 10 which is swung up from under the table to attain driving contact with the plank so that in its longitudinal direction under positive guidance in the aligned position, the plank is fed into the edge-trimming apparatus between the saw blades.

For the automatic alignment of the plank prior to being fed into the edge-trimming mechanism, there are special arrangements. The alignment table thus presents pairs of jaws 11 and 12 and 13 and 14, which are movable under positive guidance towards and away from each other across the table plane 1 so that in each pair of jaws the movement of one jaw relatively to the other in an image relation agrees with the movements of the other jaw. For carrying out the positive guidance, a central shaft 15 is placed under the table plane 1, on which shaft end gear wheels 16 and 17 are securely mounted, each running on its fixed rack 18 and 19 respectively and gear wheels 20 and 21 are freely mounted, cooperating with movable racks 22, 23 and 24, 25 respectively. Concerning the pairs of racks 22, 23, the rack 22 is securely connected to the jaw 13 and the rack 23 is likewise securely connected to the jaw 14. In the same way, the rack 24 is securely connected to the jaw 11 and the rack 25 with the jaw 12.

Both the jaws 11 and 12 are positively operated by means of the pneumatic piston cylinder 26 and both the jaws 13 and 14 in the same way by the pneumatic piston cylinder 27. Thus, when compressed air is applied to the minus side, i.e. on the rod side in the cylinder units 26 and 27 for effecting alignment of the plank, the jaws in the pairs 11, 12 and 13, 14 will approach each other from their starting positions with conforming movements owing to the rotation between the gear wheels on the central shaft 15 and all the cooperating racks. The mutual movements continue therewith until the pair of jaws 11, 12 and 13, 14 have caught the plank and clamped it in aligned position with its main axis substantially parallel to the rotation plane of both the saw blades 3 and 4. As, however, it is necessary to obtain a definite starting position for the plank transversally of the table with regard to the desirability of being able so to place the plank in the longitudinal direction that the farther wane when later sawn off will fall beyond the effective sawing distance between both the saw bades 3 and 4, i.e. beyond the immovable saw blade 3, there should be a possibility of moving the plank aligned per se transversely to a predetermined and known stop position, established in relation to the position of the stationary saw blade 3.

For this reason, a stronger piston cylinder 28 with a piston 29 is arranged under the table plane 1 parallel to the piston cylinder 27. When, therewith, simultaneous pressure is applied to the minus side in the piston cylinders 27 and 28, the jaws 11, 12 and 13, 14 respectively are displaced parallel to the forward edge of the table 1 until reaching a stop position which, for example, is determined by a micro-switch or the like.

As can be seen from the drawing, the piston cylinder unit 28, 29 is connected to a further piston cylinder unit 30, 31, the piston 31 of which constitutes the stationary part in the system consisting of the piston cylinders 27, 28 and 30 and the jaws 13, 14 and 11, 12 respectively.

If, from a starting position for the jaws, air pressure is supplied to the plus side in the piston cylinder 30, the piston cylinder 28 is displaced until reaching a predetermined starting position which, on continued maintenance of the pressure, forms a definite starting position.

If the compressed air is now inserted on the minus side in the piston cylinder 28, the piston 29, as the piston cylinder 30 is now stationary, is moved inwards into its cylinder a predetermined distance, which for example is sensed by a micro-switch, the consequence of this being that the jaw 13 is moved to a stop position corresponding to a position of the plank in which its farther wane falls beyond the sawing distance. The displacement movement is of course transmitted via the said central shaft 15 to all the jaws so that the alignment of the plank is not disturbed.

This means that the farther longitudinal edge of the plank and the stationary saw blade 3 have been finely aligned in relation to each other. It now remains, however, to carry out the width-sensing of the plank discussed above at a predetermined distance from one end of the plank and by using the result of this to displace and adjust the axially movable saw blade 4 to such a position that the forward wane of the plank is also located beyond the effective sawing distance between the saw blades 3 and 4.

If one assumes that the pair of jaws 13, 14 operate in a plane lying at the predetermined distance from one end of the plank, i.e. from the stop shield 8, it is also convenient to utilize the jaws 13, 14 directly or indirectly for determining the width of the plank.

As should have been evident from the description above, the central axis is transversely adjusted during simultaneous rotation to positions which are dependent on the distance of the jaws from each other when they both abut the wanes of the plank. Each width-sensing distance between the jaws thus corresponds to a determined displacement and pivotal position of the central shaft 15, which in accordance with an embodiment of the invention is utilized for adjusting the axially movable saw blade 4 so that its saw plane is located within the forward wane of the plank.

As can be seen from FIG. 1, a lever 32 is pivotally mounted on the central shaft 15, through which lever passes a push and pull cable 33 which is pulled by a pressure cylinder means 34 on width-sensing towards an abutment 35 in the lever, the position of which is dependent on the position of the central shaft. The cable 33 is arranged to actuate a servo unit, not shown, in the edge trimming apparatus, which in turn adjusts the movable saw blade 4 for cutting the said front wane.

To complete the description it can be mentioned that the stop shield is actuated by a pressure cylinder unit 36, the pressure rollers 9 by the pressure cylinder unit 37, 38, respectively and the drive drum 10 by the pressure cylinder unit 39, all the drive units in accordance with the invention being coordinated by means of preferably pneumatic and electric circuits which guide all movements according to a predetermined movement scheme which will be evident later in the detailed description of FIG. 3.

In order to show the possible variations in the construction of an alignment and width-sensing means according to the invention, reference is now made to FIG. 2.

Two pairs of jaws are designated by the refrence numerals 40, 41 and 42, 43 respectively in this figure, the pairs of jaws being substantially equivalent to corresponding pairs of jaws in FIG. 1, the jaws are pivotally suspended from rods 44, 45 and 46, 47 respectively around pivot shafts 48 and 49 respectively which are arranged along a comomn fixed geometrical axis indicated by 50. There are also articulations 51 between all the levers and associated jaws, parallel movement arms 52 being arranged for ensuring parallel movement of the jaws, the movement arms 52 being pivotally connected to the respective jaws so that the jaws are maintained in a strictly vertical position on pivoting of all the levers. Between the pairs of levers 44, 45 and 46, 47 respectively, toggle-like members 53 and 54 are arranged, these being actuated by means of pressure piston means 55 and 56 respectively in such a way that the jaws approach or move away from each other in order to align the plank 57 with its central axis in the same plane as the axis 50.

The pressure piston means 55 and 56 automatically align the plank 57, in this case in relation to the determined starting plane through the axis 50. Thus when the pressure is applied to the pressure cylinder unit 55 and 56, the plank is clamped between the pairs of jaws, the pair of jaws 42, 43 in addition having the function of directly sensing the width of the plank between them. With the assistance of cables 58 and 59, it is then possible, possibly via servo motors or the like, to adjust both saw blades 60 and 61 at the most convenient effective sawing distance, as both these blades in this case are assumed to be axially movable and adjustable in relation to each other and with respect to the fixed axis 50.

The invention will now be further explained with reference to a detailed embodiment, all the reference numerals 1–39 in FIG. 1 being used for the same details in FIG. 3.

In FIG. 3 a pair of U-beams extending parallel to and at a distance from each other are designated by the reference numeral 62, their upper surface representing the table plane 1. The beams are carried by a plurality of legs 63, the tops of which present angular iron sections 64 forming a gutter for receiving planks or the like to be aligned for trimming. At the forward ends of the beam 62 mounting brackets 65 are provided pivotally carrying the previously mentioned stop shield 8 so that this shield can be pivoted up from the stop position shown in the figure to a position in which it allows advancement of the plank to the right in the figure. To effect pivoting of this stop shield 8, the previously mentioned pressure cylinder means 36 is provided, being connected by a hinge means 66 to a rocking arm 67 on the shield 8.

Brackets or housings 68 extend upwardly from the forward beam 62, each housing containing one of the piston cylinder units 37 and 38 (see FIGURE 1), the piston rods 69 of which form the foundation for a yoke 70 in which the pressure rollers 9 are rotatably mounted. In addition, each yoke 70, by means of a link 71, is pivotally mounted around a shaft 72 fixed in a bracket 68. Furthermore, the pressure cylinder unit 38 and the unit 37 respectively are pivotally mounted by their upper ends by means of a yoke 73 and a pin 74 in a pair of links 75 which in turn are pivotally carried by a pivot shaft 76 direct in the bracket.

Beneath the table plane 1, a drive drum 10 is mounted in a cradle 77 which is pivotally mounted around pivot shafts 78. The cradle 77 carries a gear wheel motor 79 indicated by a broken line for operating the drum 10. The cradle is pivoted upwards, i.e. so that the drive cylinder 10 reaches contact with the plank located on the table plane 1 with the assistance of the pressure cylinder 39, the piston 80 of which, by means of a hinge 81, is pivotally mounted on the cradle itself and the opposite end of which is pivotally carried by a fixed bracket 82 in the machine stand.

As has already been described in connection with FIG. 1, a central shaft 15 extends under the table plane 1, which shaft is mounted on racks 18 and 19 by means of the end gear wheels 16 and 17 both of which are fixed to the shaft 15. These racks 18 and 19 are fixed in the stand. In addition, gear wheels 20 and 21 are freely mounted on the central shaft 15, which gear wheels cooperate with the pairs 22, 23 and 24, 25 respectively of movable racks, whereby the shaft can be subjected to a translation movement under simultaneous rotation by means of the rack system. The jaws 11, 12 and 13, 14 are fixed to the movable racks 22, 23 and 24, 25 respectively, which jaws are displaceable towards and away from each other and have a starting position in which they are outside the gutter of the table plane in receiving pockets 83.

The jaw 11 is connected to a piston rod, not shown, in the piston cylinder 26 while the piston cylinder 26 is securely attached to the jaw 12. In the same way, the jaw 13 is connected to the piston rod in the piston cylinder 27 and the piston cylinder 27 with the jaw 14. The piston cylinders 28 and 30 run parallel to the piston cylinder 27, which former cylinders are securely connected to each other and suspended by their piston racks, the piston rack of the piston cylinder 30 being fixably attached to a yoke-shaped bracket 84 in the stand and is threaded at its end and fixable by means of the nut 85. The end of the piston rod 31 thus constitutes a fixed point for the otherwise axially movable piston cylinder unit 28 and 30. The piston rod of the piston cylinder 28 is securely connected to the piston rod in the piston cylinder 27.

The piston cylinders 26 and 27 are displaceable on guide rods 86 carried by the stand.

The yoke-shaped lever 32 is freely mounted at 87 on the central shaft 15 and its ends project downwards, wherewith with the assistance of a pivot shaft 88 is is pivotally connected to a stand part 89 through the intermediation of a compression spring unit 90, the spring 90 being intended to press the lever away in the figure for a purpose which will later be described. The abutment 35 is also connected to the lever 32 by two links 91, which abutment 35 comprises a block through which the piston rod in the cylinder unit 34 is able to slide, the cylinder unit being stationarily fixed by its cylinder housing in the stand itself, more particularly in the stand part 89. Connected to the outer end of the piston rod is a push and pull cable 33 which is arranged to actuate the movable saw blade 4 to adjustment in axial direction for establishing the most effective sawing distance. The saw blade 4 is shown in a lateral position in the drawing but is intended to be included in an edge-trimming apparatus disposed after the alignment table and provided with feet-out rollers 92 and 93 respectively of which 93 is pivotally arranged in rocking levers 94 around a pivotal axis 95 so that the cylinders can be pivoted towards and away from each other when the plank passes between them.

As in many cases it is an advantage in the actual trimming to obtain widths conforming with desired standard widths, the push and pull table 33 is arranged via a special latching system to move the saw blade 4 to latched positions which, for example, adjusts the width to the nearest half-inch or inch. This latching system comprises, in the embodiment shown a, longitudinally displaceable rack 97 and a latching pawl 98 pivotally mounted around a pivot shaft 99 and actuated by a spring 100 into engagement with the teeth of the rack 97. When the push and pull cable is thus actuated into movement via the lever 32, the rack 97 is subjected to a displacement, the latching pawl 98 dropping into the closest fitting indentation and fixing the saw blade in adjusted position, i.e. the position in which the corresponding wane of the plank is located outside the effective sawing distance between the saw blades 3 and 4 and the board is cut, for example to the nearest half-inch dimension below.

For initiating a complete alignment, width-sensing and trimming operation and advancing the board into the edge-trimming apparatus which, as will be described below is intended to be carried out automatically, a foot control 101 is provided extending along substantially the whole of the alignment table means at the bottom part of the stand. The control, which has the form of a rod or tube, is pivotally mounted on rocking arms 102 in the stand. The operation is started by depressing the rod 101 against the action of a tension spring 103 tensioned between one of the arms 102 and the stand.

If a board is not to be trimmed, for example because it has parallel side edges, a further manually manoeuvrable control 104 is provided in the form of a rod or the like, which is likewise pivotally mounted in the stand by means of rocking arms 105.

A normal edge-trimming operation will be described in the following, and at the same time the pneumatic and electrical control systems indicated by broken lines and dots and dashes respectively will be explained.

To begin with, the feed table is in a starting position, i.e., with the table plane 1 empty and the jaws in the spaces 83, the pressure rollers 9 being raised and the stop shield 8 being located in the position shown in FIG. 3. It is assumed that there is no plank in the edge-trimming apparatus, which is represented at the top of the figure by the sawblade 4 and the cylinders 92 and 93. It is assumed at the same time that the compressed air in the control system has been applied, the main inlet lines for compressed air being shown with thick solid lines provided with arrows.

The operation now begins, a plank being placed in the longitudinal direction of the table plane 1 in the actual gutter with its forward end abutting the stop shield 8. With the plank in this position the foot pedal 101 is depressed.

A limit switch 106 is thereby closed and the control current passes from a supply line 107 to electrically remote-controlled compressed air valves 108 and 109, each of which is allotted an electric circuit 110, 111 respectively. The valve 108 is therewith adjusted in such a position that air is allowed to pass forward to the minus side in the cylinders 26, 27 and 28. The valve 109 is simultaneously adjusted so that air is allowed to pass to the plus side of the cylinder 30.

It can be pointed out once again that the piston 31 of the cylinder 30 is fixed in position and thus constitutes the only fixed point in the system. When the cylinder 30 is loaded on the plus side, the cylinders 28 and 30 are displaced to a fixed position for the edge-trimming operation.

When, simultaneously, the cylinder 28 is actuated by compressed air on the minus side, the jaw 13 is pulled forward to a fixed position in relation to the cylinder 28 and to the fixed sawblade 3 indicated in FIG. 1.

The cylinder 27 is simultaneously actuated on the minus side and brings the jaws 13 and 14 together at the same time that the cylinder 26, when actuated on its minus side, brings together the jaws 11 and 12, the jaws clamping the plank between them and aligning it. The shaft 15 rotates in accordance with the movement of the jaws. At the piston rod end of the cylinders 26 and 27, there is a cup spring 112, 113 respectively which is compressed when the plank is clamped between the jaws. The spring packages are assumed to be pre-stressed with a certain power in order, for example, that the resistance of the plank to displacement on the table will not effect release of three switches, viz, 114, arranged to be actuated by a washer 115 at the piston rod end of the cylinder 26, and the switches 116 and 117, arranged to be actuated by a washer 118 at the piston rod end of the cylinder 27.

At the piston rod end of the cylinder 28, a switch 119 is arranged which is closed by engagement with an abutment 120 on the cylinder 28.

The switches 114, 116 and 119 are connected in series and the circuit between them is connected to one side of an electrically remote-controlled valve 121. The said switches are connected in series so that the alignment will be completed before the immediately succeeding stage is begun.

The switch 119 ensures that the fixed jaw 13 is moved to its predetermined position. The switch 116 ensures that the forward pair of jaws 13, 14 has aligned the plank. The switch 114 ensures that the rear pair of jaws 11, 12 align the plank.

The switch 117 at the cylinder 7 closes a circuit which is connected to an electrically remote-controlled valve 122 which gives air to the minus side of the cylinder 34. The width of the plank is then sensed by the piston rod of the cylinder 34 being brought into abutment with the abutment 35 by a shoulder 123, the position of the abutment 35 being dependent on the position of the shaft 15. The cable 33 actuates the blade 4, possibly via a servo unit, not shown, in the edge-trimming appartus, the blade being adjusted in turn.

The current in the circuit from the switches 114, 116 and 119 places the valve 121 in such a position that air is allowed to pass to the plus side of the cylinder 37, 38 and 36, the pressure rollers 9 being lowered and securely clamping the plank against the board 1 at the same time that the stop shield 8 is pivoted upwards.

When the locking rollers 9 securely clamp the plank, a spring package 123 is compressed as a result of the positioning of the pressure cylinders 37, 38, switches 124 and 125 closing a circuit. These switches are connected in series so that the next stage of the operation will not begin before both the pressure rollers 9 have clamped the plank.

This circuit is connected to the valve 108, which is thereby shifted in such a way that the air is allowed to pass forward to the plus side of the cylinder 26, 27 and 28.

The jaws 11, 12 and 13, 14 now return to the starting position 83, the circuit in which the switches 114, 116 and 119 are included being broken, which, however does not serve any function. On the other hand, the switch 118 at the cylinder 27 breaks the current to the valve 122, a return spring in this readjusting the valve so that the cylinder 34 is vented. This means that the adjusted width between the blades, i.e. the effective sawing distance between the blades 3 and 4 in the edge-trimming apparatus, is not displaced when the jaws return to the starting position.

The spring loaded ratchet pawl 98 is able to hold the cable 33 when the cable is unloaded. Venting takes place so quickly that the jaws do not have time to move to any considerable extent with regard to the inertia. Simultaneously, the pressure spring 90 presses on the cable 33, the saw blade 4 being displaced to the next smaller indentation position in the edge-trimming apparatus if it happens to land between two such positions.

When the jaws come to the starting position, a switch 126 is closed by engagement with an abutment 127 on the cylinder 26. The switch 126 is connected via the circuit to switches 124 and 125 and also connected to a valve 128.

The circuit to the switches 124 and 125 is conductive in this event and the switch 126 provides current to the valve 128 which is adjusted in such a position that air is allowed to pass to the plus side in the cylinder 39. The cylinder 39 hereby pivots the cradle 47 upwards with the drive drum 10, which is motor driven, and advances the plank towards the edge-trimming apparatus.

When the plank has entered the rear drive means of the edge-trimming apparatus, represented by the rollers 92 and 93, the upper roller 93, which is suspended by the arms 94, is raised. In raising this roller, a switch 129 is unloaded and thereby closes a circuit, i.e. the current is broken when no plank passes between the rollers and closed when a plank passes through them.

An electrically remote-controlled valve 130 and the valves 121 and 128 are parallel-connected and connected in series with the switch 129 at the edge-trimming mechanism. When the current is closed, the position of the valves is shifted, the valve 128 allowing air to pass the minus side in the cylinder 39 so that the cradle 77 is turned back. The valve 121 gives air to the minus side in the cylinders 37, 38 and 36, the pressure rollers 9 being raised while the stop shield 8 is turned down in the starting position.

The valve 130 allows impulse air to pass to an air-controlled valve 131 which is thereby shifted and blocks the feed air to the valves 108 and 109. This means that a new edge-trimming operation cannot be begun before sawing of the plank in the edge-trimming apparatus has been completed.

When sawing of the plank in the edge trimming apparatus has been completed, the upper roller 93 falls down, the current being broken by the switch 129 in its circuit. The valve 130, provided with a return spring, is then shifted so that the valve 131 again allows feed air to pass. If, by actuating the control 101, the switch 106 of the valve is reversed or the switch 132 of the control 104 is reversed as will later be described, while the switch 129 is connected, the electric impulse passes to the valves 108 and 109, their valve spindles being placed in position by separate impulse air. The impulse lines are shown with broken lines. The feed air, however, is blocked by the valve 131, nothing happening therefore before this valve allows feed air to pass, when a new edge-trimming course is begun.

On the occurrence of a too early impulse, the feed table thus "waits" until the plank in the edge-trimming apparatus has been sawn and a new impulse need not be given, nor a rest impulse.

It is only the valves 108 and 109 which need to be blocked in order to prevent a premature start. The valves 121 and 128 are dependent on switches actuated by the valves 108 and 109, as can be seen from the electric lines shown. At least the valve 128 should have its electrical connections cross-connected so that current cannot pass to both the induction coils simultaneously.

These induction coils are shown as cylindrical projections at the ends of the valves.

When the switch 129 is operated, current is led to one of the induction coils of the valve 128 at the same time that during a short period of time a voltage is applied to the other induction coil, but owing to the cross-connection no damage can occur. Current is passed simultaneously to one side of the valve 121, its other side being currentless, the valve therefore being shifted. Air then passes to the minus side in the cylinders 37, 38 and 36, the switches 124, 125 breaking the circuit in which the switch 126 is connected. This means that the switch 126 becomes currentless although it is connected-in. One side of the valve 128 thus becomes currentless and current passes to the other side when the cross-connection is reversed. A voltage drop must thus be obtained in one side before the other is connected.

It can of course occur during the trimming operation that the plank already has parallel side surfaces and therefore is not to be processed.

Thus, if a plank passes down into the gutter and it is observed that it does not need to be trimmed, measures are taken to feed it away.

The hand control 104 is herewith manually raised, the limit switch 132 thus being closed. Current is now allowed to pass to one side of the valve 108 and to the other side of valve 109. What distinguishes free advancement from trimming is that the valve 109 places itself in reversed position and air is allowed to pass to the minus side in the cylinder 30.

This means that the cylinders 28 and 30 are pulled into a new fixed position. When pressure is applied to the minus side in the cylinder 28, the fixed jaw is pulled towards a new fixed position, lying at a certain distance within the fixed blade 3. The plank is aligned, however, in the same way as in preparation for trimming.

When pressure is applied to the minus side of the cylinder 30, a switch 133 is closed which is connetced to the valve 122 parallel to the switch 118. The width-sensing cylinder 34 now pulls the cable 33 in the adjustment means of the edge-trimming apparatus. The operation proceeds according to the trimming method described but the cylinder 34 does not lose its pressure when the switch 18 is opened as the switch 133 is open all the time. This means that the cylinder 34 pulls the cable with it when the jaws pass to the starting position 83. The shaft 15, from which the width is sensed, rotates towards the centre of the table. The movable blade 4 thereby comes so far out that the plank can pass between the blades.

If it should happen that the hand or foot-control 104, or 101 respectively is pressed without a plank being in the gutter, the whole operation cycle will start but can be stopped when the moment is reached when the switch 129 is to zero position the feed table. An emergency release 134 is therefore arranged in the form of a switch, with which it is possible to bypass the switch 129 and close its circuit.

The switch 134 thus replaces the moment when the plank raises the roller 93 in the event of an impulse having been given for trimming or free advancement without a plank being in the gutter.

A restriction 135 is provided at the cylinder 36 so that the screen 8 will lower itself slowly in order that the plank will not be damaged during advancement into the edge-trimming apparatus. The adjustment of wane width is determined on the basis of experience in sawing planks. The wane width constitutes the difference between half the width sensed by the forward pair of jaws and half the width placed between the blades.

For this purpose, an adjustment means is provided at the forward pair of jaws. This comprises the threaded end of the piston rod 31 and the nut 85, wherewith the whole cylinder unit 28, 30 can be axially displaced in relation to the yoke 84.

A spacer ring 136 is arranged on the piston rod 31, which piston ring, on application of compressed air to the minus side of the cylinder 30, goes against one leg 137 of the bracket 84, the piston cylinder system 27, 28 and 30 therefor always being displaced a determined distance on by-pass feed.

The arrangement according to FIG. 4 is particularly suitable for boards of irregular shape. It conforms very largely with the arrangement according to FIG. 1 and to the extent that the different parts in the arrangements according to FIGS. 1 and 4 completely agree with each other they are designated by the same reference numerals. In the embodiment shown in FIG. 4, a third pair of jaws 138 and 139 are arranged between the pairs of jaws 11, 12 and 13, 14. The jaws 138 and 139 are each actuated by a piston cylinder 140 and 141, the arrangement being such that the nearer piston cylinder 140 is supplied with pressure medium on its plus side simultaneously with the supply of pressure medium in the minus side of the piston cylinders 26, 27 and 28, while the piston cylinder 141 is supplied with pressure medium only when the board has been centered by means of the jaws 11, 12, 13, 14 and 138.

A switch 142 is arranged on the jaw 139, which switch, on engagement with the board 2, gives impulse to the continued edge-trimming operation according to the above but with the exception that the width-sensing is arranged in another way, as will be described below. A further-switch 143 is securely mounted in the stand and is so situated that the jaw 139 engages it if the edge of the board opposite this jaw is located within the jaw 13. The arrangement therewith is such that the switch 143, on engagement with the jaw 139, gives impulse to the reversing of the pressure medium from the minus side of the piston cylinder 28 to its plus side. As a result of parallel control by means of the shaft 15, the racks 18, 19, 22, 23, 24 and 25 and the gear wheels 16, 17, 20 and 21, the whole system is drawn towards the piston cylinder 141 so that the board engages the switch 142 which gives impulse to the continuation of the edge-trimming operation.

For sensing the width, three telescopic arms 144, 145 and 146 are arranged each of which is pivotally connected at one end of the jaws 12, 138 and 14 respectively and pivotally attached by its other end to a fixed rod 147 running parallel to the shaft 15. Push and pull cables 148, 149 and 150 respectively are attached to each one of the arms 144, 145 and 146. The ends of the cables 148–150 facing away from the arms 144–146 pass through apertures 151 in a plate 152 mounted on a stationary shaft. On the ends of the cables 148–150 projecting through the apertures 151 there are stop shoulders 153, arranged to engage the plate 152, they, with the jaws 12, 138 and 14 in the same position, adopting in the same position in relation to the plate. In sensing the width, the plate 152 is pivoted in a clockwise direction by means of the piston cylinder 34, the plate 152 stopping in a position where it is arrested by the stop shoulder projecting least from the plate, while a push and pull cable 33 is fixed to the plate 152 for adjustment of the movable blade 4.

A further modification of the arrangement according to FIG. 1 is shown in FIGS. 5 and 6. This modification is distinguished from the arrangement according to FIG. 1 in that the jaws 13' and 14' sense the average width of a part of the board 2. For this purpose, each one of the jaws 13' and 14' presents a rod 155, pivotal about a vertical axis 154, the ends of which rod present stops 156 for aligning the board. The distance of the jaws 13', 14' from the sawing plane 157, 158 respectively of the blades 3, 4 is designated by *a*.

A still further way of allowing the jaws to engage the board 2 is shown in FIG. 7, where the board is assumed to be turned with its wane towards the table plane 1. The jaws 159 and 160 engage the wane 161, 162 respectively near the table plane, a pressure roller 163 allowing transversal displacement of the board during the alignment, pressing the board against the table plane 1 to prevent it from being raised by the jaws. This system can be preferable in the event of the wane width varying greatly from board to board. The distance between the wanes is designated by b, while the distance between the jaws is designated by c and the sawing planes by 164 and 165.

The invention is not limited to the embodiments shown and described but can be varied in many ways within the scope of the basic inventive idea.

Having now described the invention, what I claim as new and desire to secure by Letters Patent, is:

1. An apparatus for edge-trimming timber comprising in combination: two power operated cutting means arranged side by side and being adjustable relative to each other for varying the space between them in order to accommodate pieces of timber of different widths; an elongated bench for supporting the piece of timber to be trimmed; at least a pair of timber alignment jaws transversally movable in relation to and disposed along said bench; means for positively guiding each pair of jaws in such a way that the movement of one jaw in said pair relative to the other conforms in image relationship with the movement of the other jaw; sensing means for determining the width at at least one point along the length of the piece of timber when aligned; means for adjusting the cutting means in accordance with the sensed width; and means for longitudinally advancing the piece of timber through said cutting means while maintaining it in the aligned position.

2. An apparatus for edge-trimming timber comprising in combination: two power operated cutting means arranged side by side and being adjustable relative to each other for varying the space between them in order to accommodate pieces of timber of different widths; an elongated bench for supporting the piece of timber to be trimmed; at least one pair of timber alignment jaws transversally movable in relation to and disposed along said bench; means for positively guiding each pair of jaws in such a way that the movement of one jaw in said pair relative to the other conforms in image relationship with the movement of the other jaw; sensing means for determining the width at at least one point along the length of the piece of timber when aligned; means for adjusting the cutting means in accordance with the sensed width; means for longitudinally advancing the piece of timber through said cutting means; and means for maintaining the piece of timber in the aligned position during said longitudinal advancement.

3. The combination as claimed in claim 2 wherein said means for longitudinally advancing the aligned piece of timber comprises a drive roller adapted to engage the lower surface of the piece of timber and having its axis arranged transversely with respect to the longitudinal axis of said bench, and wherein said means for maintaining the piece of timber in the aligned position during longitudinal advancement thereof comprises at least two rollers adapted to be raised and lowered and having their axes arranged transversely with respect to the longitudinal axis of said bench and being arranged to exert downward pressure against the piece of timber.

4. The combination as claimed in claim 2, including means to move said cutting means apart and to hold them in position so as not to engage the aligned piece of timber as it passes between the same.

5. The combination as claimed in claim 2, including a retractable stop means for longitudinally positioning the piece of timber in relation to said sensing means.

6. The combination as claimed in claim 2, wherein said means for guiding each of said pairs of jaws comprises a shaft extending longitudinally along the bench, a plurality of gear wheels mounted for free rotation on said shaft and corresponding to the number of pairs of jaws, a rack connecting each jaw of each of said pairs, the racks in each jaw pair engaging diametrically opposed teeth of the gear wheel allotted to said pair.

7. The combination as claimed in claim 2 wherein one of said two power operated cutting means is stationary and the other is adjustable for varying the space between them; and further comprising means for moving all jaws in unison transversally to said bench in order to place one edge of the aligned piece of timber to be trimmed in a predetermined relationship to the cutting plane of said stationary cutting means.

8. An apparatus for edge-trimming timber, comprising in combination: two power operated cutting means arranged side by side, one of said means being stationary and the other being adjustable for varying the space between them in order to accommodate pieces of timber of different widths; an elongated bench for supporting the piece of timber to be trimmed; at least one pair of timber alignment jaws transversely movable in relation to and disposed along said bench; a shaft extending longitudinally along the bench and having a number of gear wheels mounted for free rotation thereon and corresponding to the number of pairs of jaws; a rack connecting each jaw of each of said pairs, the racks in each jaw pair engaging diametrically opposed teeth of the gear wheel allotted to said pair; at least two fixed gear wheels disposed along said shaft, a fixed rack extending transversely to said bench, said fixed rack being engaged by said fixed gear wheels; means for exerting a force against the system comprising said pairs of jaws together with the corresponding racks and shaft, for moving said system transversally to said bench in order to place one edge of the aligned piece of timber to be trimmed in a predetermined relationship to the cutting plane of said stationary cutting means; sensing means for determining the width at at least one point along the length of the piece of timber when aligned; means for adjusting the adjustable cutting means in accordance with the sensed width; means for longitudinally advancing the piece of timber through said cutting means; and means for maintaining the piece of timber in the aligned position during said longitudinal advancement.

9. The combination as claimed in claim 8, wherein said means for advancing the aligned piece of timber comprises a drive roller which is arranged to engage the lower surface of the piece of timber.

10. The combination as claimed in claim 8, wherein said means for maintaining the piece of timber in the aligned position during longitudinal advancement thereof comprises at least two rollers adapted to be raised and lowered and having their axes arranged transversally with respect to the longitudinal direction of said bench and being arranged to exert downward pressure against the piece of timber.

11. The combination as claimed in claim 8, including means capable of moving the system comprising said pairs of jaws together with the corresponding racks and shaft transversally to the bench in order to place the aligned piece of timber in a position so as not to be engaged by said stationary cutting means; and means for moving and holding said adjustable cutting means in a position so as not to engage said piece of timber as it passes between said cutting means.

12. The combination as claimed in claim 8, including a retractable stop means for longitudinally positioning the piece of timber in relation to said sensing means.

References Cited by the Examiner

UNITED STATES PATENTS

| | | | |
|---|---|---|---|
| 190,840 | 6/1877 | Evans | 143—37 |
| 1,881,954 | 10/1932 | Payzant | 143—37 |

WILLIAM W. DYER, Jr., *Primary Examiner.*

R. J. ZLOTNIK, *Assistant Examiner.*